United States Patent
Beardsley

(10) Patent No.: US 6,315,197 B1
(45) Date of Patent: Nov. 13, 2001

(54) VISION-ENABLED VENDING MACHINE

(75) Inventor: Paul Beardsley, Boston, MA (US)

(73) Assignee: Mitsubishi Electric Research Laboratories, Cambridge, MA (US)

( * ) Notice: Subject to any disclaimer, the term of this patent is extended or adjusted under 35 U.S.C. 154(b) by 0 days.

(21) Appl. No.: 09/377,556

(22) Filed: Aug. 19, 1999

(51) Int. Cl.[7] .................................................. G06F 7/08
(52) U.S. Cl. ........................ 235/381; 235/454; 382/103; 705/1
(58) Field of Search .................................. 235/381, 454, 235/462.01–462.03, 462.13, 469, 470, 382, 382.5, 494; 705/43, 14, 1; 283/67; 382/103, 165, 181, 190

(56) References Cited

U.S. PATENT DOCUMENTS

| | | | |
|---|---|---|---|
| 4,924,078 | * | 5/1990 | Sant'Anselmo et al. ............. 235/494 |
| 5,128,525 | * | 7/1992 | Stearns et al. ........................ 235/454 |
| 5,543,608 | * | 8/1996 | Rantalainen ......................... 235/494 |
| 5,607,187 | * | 3/1997 | Salive et al. ............................ 283/67 |
| 5,947,369 | * | 9/1999 | Frommer et al. .................... 235/382 |
| 6,088,482 | * | 7/2000 | He et al. .......................... 235/494 X |
| 6,199,754 | * | 3/2001 | Epstein ............................. 235/381 X |
| 6,256,046 | * | 7/2001 | Waters et al. .................... 382/103 X |

FOREIGN PATENT DOCUMENTS 12-67369 A * 3/2000 (JP) .

* cited by examiner

Primary Examiner—Michael G. Lee
Assistant Examiner—Jared J. Fureman
(74) Attorney, Agent, or Firm—Dirk Brinkman

(57) ABSTRACT

An interactive vending machine includes a camera, an output device, and a vision system connected to the camera and the output device. The vision system includes a processor for detecting a logo batch, and interacting with a consumer via the output device in response to detecting the logo batch.

5 Claims, 3 Drawing Sheets

VISION-ENABLED VENDING MACHINE

FIELD OF THE INVENTION

This invention relates generally to automated vending machines, and more particularly to vending machines equipped with vision systems to interact with consumers detected near the vending machine.

BACKGROUND OF THE INVENTION

Increasingly, consumer transactions are conducted with automated machines Vending machines have been around for a long time. Automated teller machine (ATMs) are now also a common variation of a vending machine. As an advantage, automated machines can operate around the clock at convenient locations with minimal attention.

Many of these machines are equipped with cameras. In most cases and particularly for ATMs, the camera is strictly used for surveillance and security, see for example, U.S. Pat. No. 4,866,661, "Computer controlled rental and sale system and method for a supermarket and the like." In surveillance situations, there is no interaction between the consumer and the camera system, other than to detect misuse.

U.S. Pat. No. 5,822,216 "Vending machine and computer assembly" provides a vending machine with a camera system to record live performances of consumers for use in TV commercial and for audition. For example, the consumer can access a homepage of a company and audition for a TV commercial for promotional use or by two-way performances via the internet.

U.S. Pat. No. 5,923,406 "Consumeral postage stamp vending machine" uses a camera in a vending machine to capture an image of the consumer, and to print a consumeralized postage stamp on a recording medium.

In U.S. Pat. No. 5,728,999 "Vending machine, a vending system and methods for operating same," a camera is used as a purchase sensing unit. The camera acquires continuously the image of articles present in a vending machine. An image processor coupled to the camera detects changes in a recorded image both before and after each purchase, and during the purchase. The processor is used to compare between successive images to detect changes, to provide an indication of items that have been removed.

U.S. Pat. No. 5,619,619 "Information recognition system and control system using same" teaches vision system that recognizes facial expressions using a neural network. One application describes the use of the vision system with a vending machine to provide instructions depending on the operator's facial expressions.

U.S. Pat. No. 5,594,806 "Knuckle profile identity verification system" describes an identification system that can be used with vending machines and ATMs. The system uses a camera to scan the knuckles of an operator's hand as the operator's hand works the machine.

Waters et al. in "Visual Sensing of Humans for Active Public Interfaces" describe computer vision-based sensing of people in front of a public kiosk. The vision system employs color and stereo tracking to sense user activity and location, and to direct a speaking agent in the kiosk display unit to attract attention, and to communicate with the user through visual and audio modalities.

It is desired to provide vending system equipped with a vision system. The vision system should be able to detect preferred consumers, and cause the vending machine to interact with preferred consumers.

SUMMARY OF THE INVENTION

The invention provides an interactive vending machine which includes a camera, an output device, and a vision system connected to the camera and the output device. The vision system includes a processor for detecting a logo batch, and interacting with a consumer via the output device in response to detecting the logo batch. A logo batch can also be part of an article of clothing, or carried accessory.

The detection involves the processing steps of acquiring an image with the camera, identifying background (non-logo) parts of the image, identifying enclosed set(s) of pixels surrounded by the background, identifying internal set(s) of pixels which are both surrounded by background and which contain some colors similar to the logo colors, marking a convolution set of pixels around the boundary of each internal set, determining gradients of the image color for each convolution set, fitting an ellipse to high color gradients in each convolution set, and testing for the presence of the logo within each computed ellipse.

DETAILED DESCRIPTION OF THE PREFERRED EMBODIMENT

VISION-ENABLE VENDING MACHINE OVERVIEW

Figure 1:
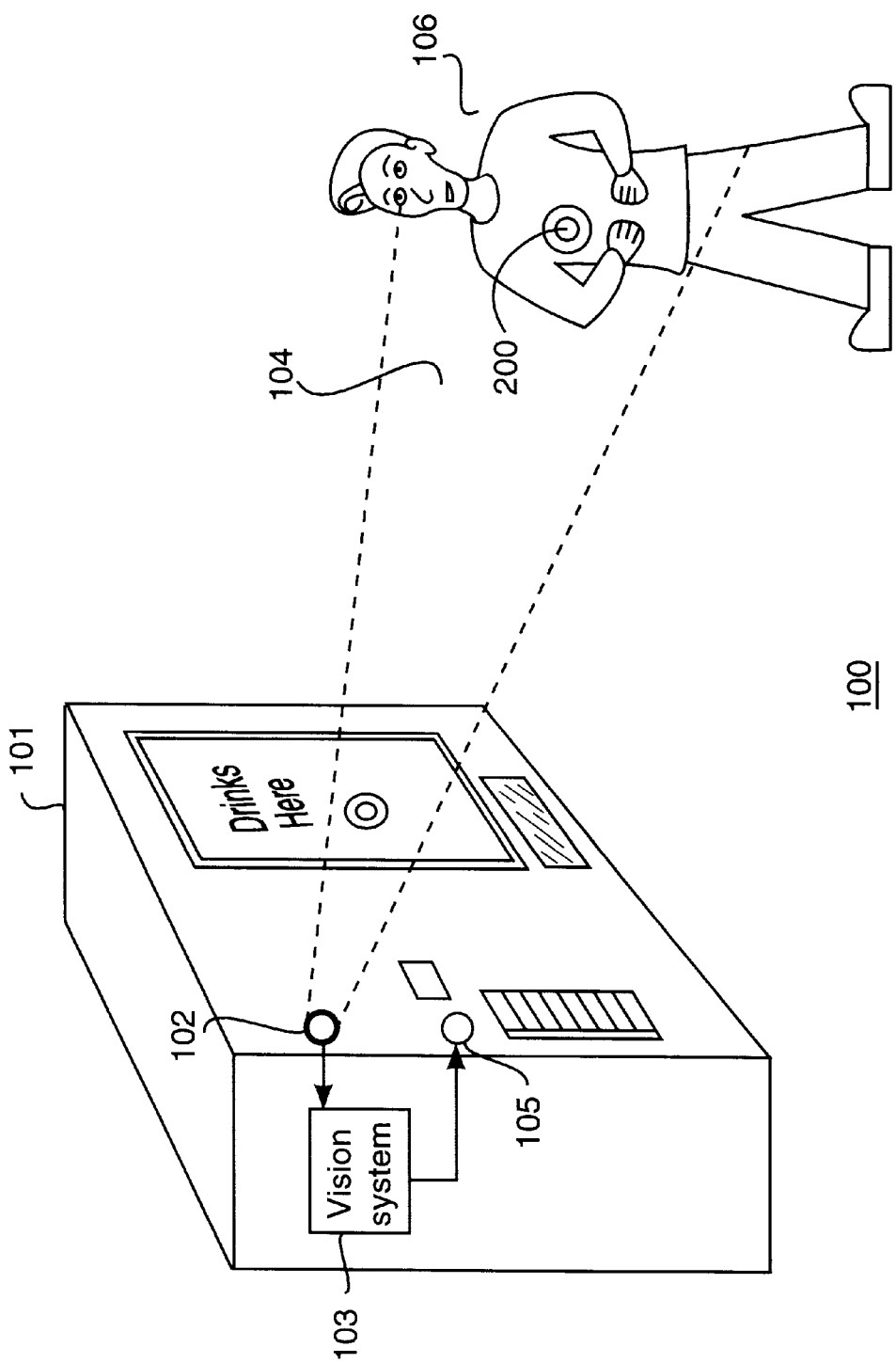
FIG. 1 is a block diagram of a vision-enabled vending machine system according to the invention.

FIG. 1 shows an automated vending machine system 100 according to the invention. The system 100 includes a vending machine 101 equipped with a camera 102 and a vision system 103 connected to the camera and the vending machine. The vision system is to detect the entrance of a consumer 106 into the scene 104 in front of the camera. The system detects whether the consumer is wearing a specific logo batch 200. The logo batch is used to identify preferred consumers. In response to detecting the logo batch, the vision system causes the vending machine to interact with the consumer using artificially generated speech using output devices 105 or a text display, or any other meaningful output.

The camera 102 can be a Mitsubishi Electric Inc. "artificial retina" (AR), part number M64289U. The AR is a CMOS image sensor with 352×288 color sensitive pixels. The AR chip can achieve high performance at low power consumption. The vision system can be based on a Mitsubishi Electric Inc. single chip CMOS microcomputer, part number M32000D4AFP. The chip includes a 32-bit processor and 2MB of DRAM and a 4KB bypass cache. The camera and controller together can be obtained for tens of dollars satisfying the need for relatively simple components having mass market appeal at a reasonable cost. The vision system executes a logo detection method as described in greater detail below.

LOGO BATCH

Figure 2:
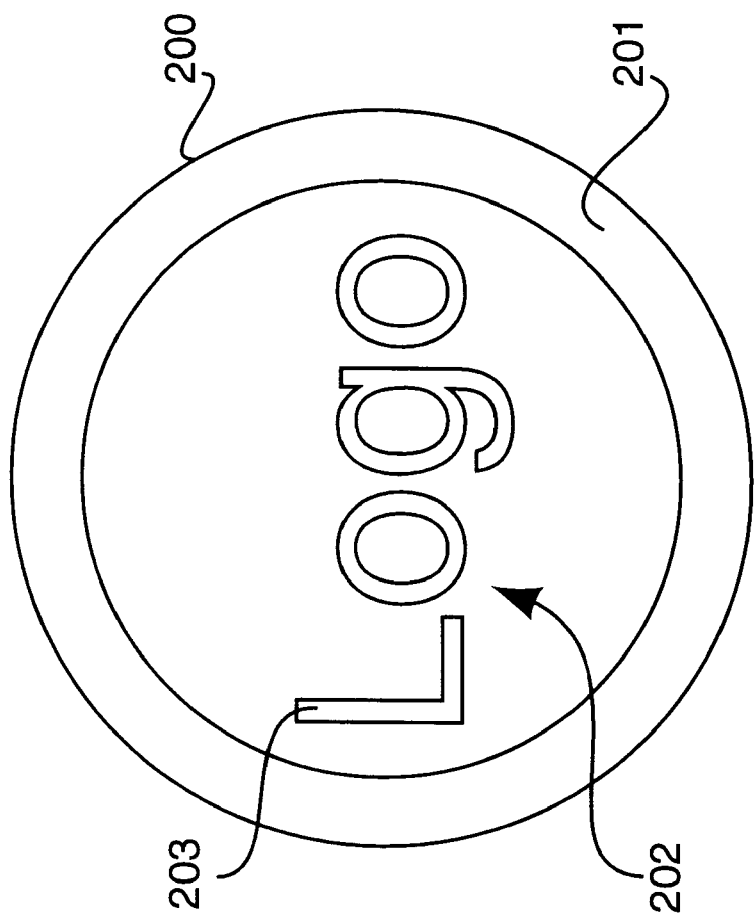
FIG. 2 is a schematic of a logo detected by the system of FIG. 1.

As shown in FIG. 2, the logo batch 200 has the following properties. A boundary 201 of the logo batch has a known background color, for example white. The batch is approximately circular in shape when viewed from the front. When viewed from an angle, the shape of the batch will appear elliptical. The boundary encloses an internal area 202 of a different color. A logo 203 is disposed in the internal area.

Parts 202 and 203 are composed predominantly of a small number of known colors, for example, one or two colors. Herein, these will be described by the term "logo colors." However, this does not imply that the logo must be composed only of those colors, for instance, the batch 200 can be a design which incorporates some small details whose color differs from the dominant logo colors.

The logo detection method, described below, can be applied to a logo batch printed on a shirt or other article of clothing. In this case, the main color of the clothing is the background color. The method can also be used for a circular badge with a border of a single color, in which case the border is the background color. The detection method of the vision system 103 does not require that a perfect view of the complete logo surrounded by the background color is available. The method incorporates processing to ensure correct identification of a logo in the presence of occlusions of small areas of the logo.

DETECTION METHOD

Figure 3:
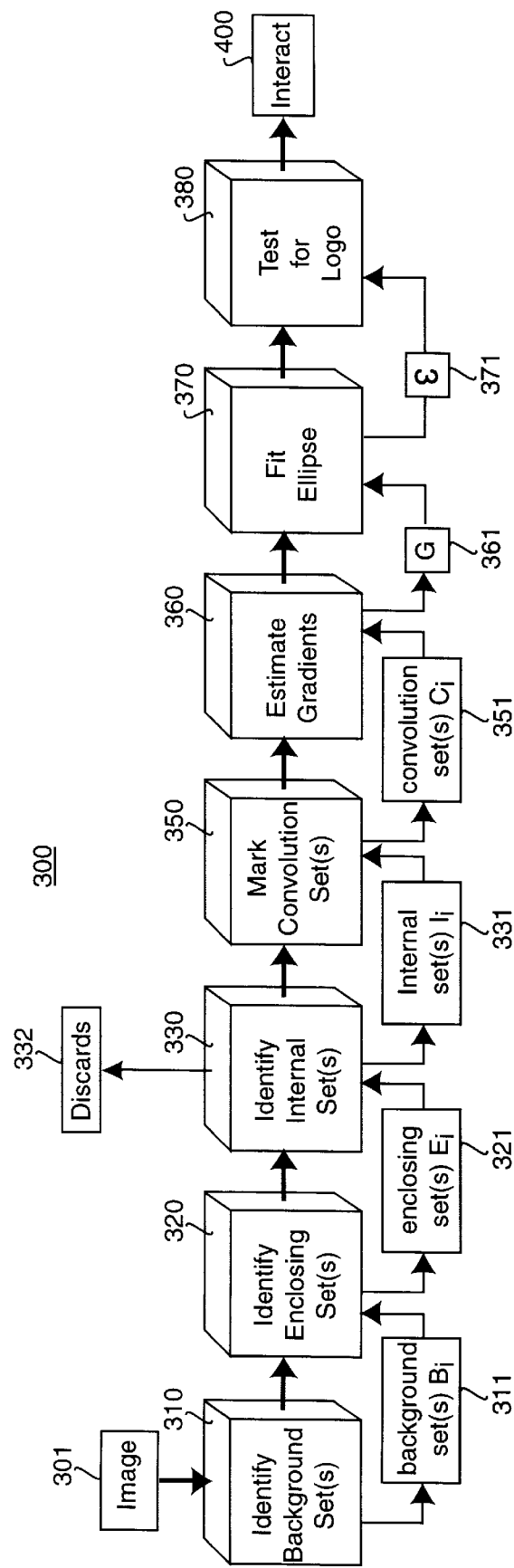
FIG. 3 is a flow diagram of method steps executed by a vision system of FIG. 1.

FIG. 3 show the steps of a method 300 executed by the vision system for detecting the logo 200.

IDENTIFY REGIONS OF BACKGROUND COLOR

The method starts with an image 301 of the scene 104 as acquired by the camera 102. First, the method identifies 310 pixels in the image 301 whose color is substantially similar to the background color, using the test described in the "color similarity test" below. The identified pixels (if any) are subject to a connected-component analysis to generate one or more "eight-connected" background sets. These background sets 311 are labeled $B_i$, where i=1, . . . , l.

COLOR SIMILARITY TEST.

The color similarity test determines whether a pixel in the image with RGB value $C_p=(R_p,G_p,B_p)$ is similar to a target color with RGB value $C_t=(R_t,G_t,B_t)$. The test is partly invariant to changes of illumination. A unit three-vector $c_p=C_p/mag(C_p)$ is computed for the pixel color, where $mag(C_p)$ is the magnitude of $C_p$. Similarly, a unit three-vector $c_t=C_t/mag(C_t)$ is computed for the target color. The dot product $D=C_p \cdot c_t$ is calculated. If the dot product D exceeds a threshold τ, then the color $C_p$ is accepted as similar to the color $C_t$. A "color similarity score" is obtained by normalizing the computed dot product D so that D=τ maps to a similarity score of zero and D=1 maps to a similarity score of one.

IDENTIFY REGIONS OF BACKGROUND COLOR WHICH FROM ENCLOSING SETS

For each of the identified background sets $B_i$ 311, step 320 determines whether $B_i$ is an enclosing set $E_i$ 321. A background set $B_i$ is an enclosing set when the pixels of $B_i$ completely enclose a set of pixels having a color different to the background color. Any background set which is an enclosing set is labeled $E_i$, where i=1, . . . , m, m<=l. Extra processing ensures that a background set which "almost" forms an enclosing set (like a letter "C") is augmented with extra pixels so that it does form an enclosing set (like a letter "O"). This prevents small occlusions of the logo 200 from adversely affecting the algorithm.

AUGMENTING BACKGROUND SET TO FORM AN ENCLOSING SET

First compute the convex hull of the background set B. Then, compute the set of pixels P which form the 8-connected boundary of the convex hull. For illustration, consider a background set which is shaped like a letter "C".

Each pixel in the computed set P is either a member of B e.g. a pixel on the left-side, top, or bottom of the letter "C" or is not a member of B, e.g. a pixel in the gap on the right-side of the letter "C". Iterate around successive pixels in the set P, recording a count G which indicates the number of successive pixels forming a gap. This is done in the following way - at each step in the iteration, set G to zero when the pixel is a member of B, or increment the count G by one if the pixel is not a member of B. Keep a record of the largest value $G_{max}$ which G attains at any point in the iteration. At the end of the iteration, compute $(G_{max}/N(P))$ where N(P) is the number of pixels in P. If $(G_{max}/N(P))$ is less than a threshold τ, then augment B by adding to it all the pixels in P which are not currently in B. The augmented set is now an enclosing set. In terms of the illustrative example, the letter "C" has been augmented to form a letter "O".

IDENTIFY INTERNAL SETS OF LOGO COLOR

Each enclosing set Ei defines an internal (enclosed) set of pixels 331. In step 330, each internal set which contains at least one pixel with a value similar to the logo colors is labeled $I_i$, where i=1, . . . , n, n<=m. Internal sets which do not pass this test are discarded 332. The test for whether a pixel in an internal set is the same as the logo colors uses the "color similarity test" described previously.

IDENTIFY CONVOLUTION SETS

For each accepted set $I_i$ 331, step 350 puts all pixels that are close to the boundary of $I_i$ into a convolution set $C_i$ 351. Step 350 is achieved in the following way—first compute the convex hull of the region $I_i$; then compute the "effective radius" R of the convex hull where R equals the length of the boundary of the convex hull divided by 2π; then compute D=λR, where λ is a fixed value less than 1 and typically about 0.1; finally, place all pixels which are within distance D of the boundary of the convex hull of $I_i$ into $C_i$. Essentially, $C_i$ is a "thickened" boundary for the set of pixels in $I_i$.

ESTIMATING IMAGE COLOR GRADIENTS

For each set of pixels $C_i$, step 360 estimates gradients G 361 using a method sensitive only to transitions between background color and logo colors. Those gradients which are aligned with radial directions from the center of gravity of $C_i$ are accepted to form a gradient set 361 for further processing. Gradients which are not aligned radially from the center of gravity of $C_i$ are discarded.

The estimation of color gradients is carried out as follows. Let the background color be $C_b$ and the logo colors be $C_{li}$, i=1 . . . p. Let the color of a pixel at an image location (x,y) be C(x,y). First find the color similarity score S1 of C(x,y) to $C_b$(see "Color similarity test" ).

Then process in turn each of the eight radial directions $R_i$, i=1, . . . ,8, emanating from (x,y). Compute the score S2 for the difference in intensity between pixel (x,y) and the adjoining pixel along radial direction $R_i$. The score is normalized to the range 0–1, where zero indicates the two pixels have identical intensity, and 1 indicates that the difference between intensities is greater than or equal to a threshold τ. Set a flag F to true if any pixel along the radial direction up to a pre-set distance, typically five pixels, is similar to the logo colors $C_{li}$(see "Color similarity test" ). Finally, if flag F is true, then compute a gradient score G=S1 *S2, else if flag F is false, set G=S1*S2*W where W is a weighting factor less than 1. In this way, high gradient scores are obtained in areas where there is a transition between background color and logo colors.

Set the gradient score at location (x,y), G(x,y) to be equal to the maximum value of G computed along each of the eight radial directions,

FIT ELLIPSE

For each set $C_i$, an ellipse $\epsilon$ 371 is fitted 370 to the corresponding gradients 361 using, for example, the ellipse fitting method of Fitzgibbon, and the RANSAC algorithm, see Fitzgibbon et al. in "Ellipse Fitting: Direct Least Square Fitting Of Ellipses," IEEE Trans. PAMI, Vol 21, No 5, May 1999, Fischler et al. in "RANSAC: Random Sample Consensus: a paradigm for model fitting with application to image analysis and automated cartography," Commun. Assoc. Comp. Mach., Vol 24, 1981.

For each set $C_i$, the RANSAC algorithm generates multiple possible ellipse solutions, each one of which is scored according to how well it fits to the gradients 361. The highest scoring ellipse is kept as the best fit for the current region $C_i$.

EVALUATION SCORE FOR AN ELLIPSE

Given a set of computed gradients G in an image, and an ellipse $\epsilon$ which is postulated as a fit to those gradients, the evaluation score is obtained by summing the gradient values for all gradients which coincide with the boundary of the ellipse

TEST FOR LOGO

The area inside the ellipse 371 is assumed to include the logo 202. The logo 202 may have undergone perspective distortion, for example a circular badge will appear as an ellipse under perspective projection when the badge is tilted away from the frontal position. The distortion is corrected using an affine transformation.

Finally, for each perspectively corrected ellipse, a test is done to determine whether the logo is located therein. The test can use invariant moments, see Hu in "Invariant Moments: Visual Pattern Recognition by Invariant Moments," IRE Trans. on Information Theory, Vol IT-8, 1962. If the test succeeds for any ellipse, the logo has been detected, and the vending machine is directed to interact 400 with the consumer.

Having now described a few embodiments of the invention and some modifications and variations thereto, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalents thereto.

I claim:

1. An interactive vending machine, comprising:
   a camera;
   an output device; and
   a vision system connected to the camera and the output device, the vision system comprising:
   means for detecting a logo batch associated with a consumer; and
   means for interacting with the consumer via the output device in response to detecting the logo batch.

2. The vending machine of claim 1 wherein the logo batch has a predetermined background color enclosing an internal area having a logo color.

3. The vending machine of claim 1 further comprising:
   means for identifying a background set of pixels having a background color;
   means for identifying an enclosed set of pixels;
   means for identifying an internal set of pixels;
   means for marking a convolution set of pixels;
   means for determining gradients of the convolution set of pixels;
   means for fitting an ellipse to the convolution set; and
   means for testing for a logo within the convolution set fitted with the ellipse.

4. A method for interacting with a consumer using a vending machine, comprising the steps of:
   acquiring an image with a camera, the camera disposed to view a scene in front of the vending machine;
   detecting a logo batch in the image; and
   directing the vending machine to interact in response to detecting the logo batch.

5. The method of claim 4 wherein the detecting further comprises the steps of:
   identifying an enclosed set of pixels in the image;
   identifying an internal set of pixels;
   marking a convolution set of pixels;
   determining gradients of the convolution set of pixels;
   fitting an ellipse to the convolution set; and
   testing for a logo within the convolution set fitted with the ellipse.

* * * * *